United States Patent Office 3,030,353
Patented Apr. 17, 1962

3,030,353
CONVERSION PRODUCTS OF AZO DYESTUFFS CONTAINING HEAVY METAL BOUND IN COMPLEX LINKAGE
Werner Kuster, Basel, Switzerland, assignor to J. R. Geigy A.-G., Basel, Switzerland
No Drawing. Filed June 2, 1959, Ser. No. 817,482
Claims priority, application Switzerland June 12, 1958
7 Claims. (Cl. 260—147)

The present invention concerns conversion products of azo dyestuffs containing heavy metal bound in complex linkage and the production thereof, as well as their use for the fast dyeing of cellulose acetate in the mass and of lacquers, and, finally, the material dyed with the aid of these dyestuffs.

It has been found that valuable, new, acetone-soluble conversion products of metallised azo dyestuffs are obtained if complex compounds of azo dyestuffs containing co-ordinatively bound hexavalent heavy metal, which dyestuffs contain no sulphonic acid groups and correspond to the general Formula I

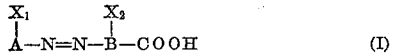

are reacted with organic nitrogen bases consisting of at least up to 70 mol percent of bases not having dyestuff character and, possibly, of up to 30 mol percent of bases having dyestuff character.

In this formula, $X_1$ and $X_2$ are metallisable groups in the neighboring position to the azo group, of which one X must be a hydroxyl group. A represents a radical of the benzene, naphthalene, pyrazolone or acylacetylarylamide series and B represents a radical of the benzene or naphthalene series. The carboxyl group in Formula I is in the neighbouring position to $X_2$.

The azo dyestuffs can contain the substituents usual in azo dyestuffs, for example, halogens, in particular chlorine and bromine, also nitro, cyano, alkyl, ether, alkyl sulphonyl, sulphonic acid amide groups as well as acylamino groups.

Dyestuffs according to the invention which contain a sulphonyl substituent which does not dissociate acid are particularly valuable. Such sulphonyl substituents are, for example, the lower aliphatic, cycloaliphatic, araliphatic or aromatic sulphonyl groups, for example, methyl, ethyl, butyl, cyclohexyl, benzyl, phenyl, p-toluyl, xylyl sulphonoyl groups; sulphonic acid amide groups which can possibly be substituted at the N atom by aliphatic, cycloaliphatic, araliphatic or aromatic groups, for example, N-methyl, N-ethyl, N.N-dimethyl, N.N-diethyl, N.N-dibutyl, N-cyclohexyl, N.N-dicyclohexyl, N-benzyl, N-phenyl, N-phenyl-N-ethyl, N-phenyl-N-benzyl sulphonic acid amide groups; or sulphonic acid amide groups in which the amide nitrogen atom is a member of a saturated or unsaturated cyclic amine, such as e.g. in the sulphonic acid piperidide or morpholide group.

The metallisable groups $X_1$ and $X_2$ are principally represented by the hydroxyl group; however, one X can also be the carboxyl group or an amino group.

When, in the metal-containing dyestuffs corresponding to the general Formula I used according to the invention, B is the radical of a coupling component, for example a 2-hydroxynaphthalene-3-carboxylic acid or a 2-aminonaphthalene-3-carboxylic acid is used as such, then A is the radical of any unsulphonated o-hydroxy- or o-carboxy- aryl diazo compound desired. A 2-hydroxy-1-diazobenzene can be used for example as diazo component, which diazobenzene compound may contain the substituents usual in azo dyestuffs which do not dissociate acid in water, for example, halogen, alkyl, alkoxy, nitro, acylamino, alkyl sulphonyl, aryl sulphonyl, sulphonic acid amide groups and sulphonic acid amide groups which can be organically substituted at the nitrogen atom. The following diazo components can be used for example for the production of metal-containing dyestuffs according to the invention: 4-chloro-2-amino-1-hydroxybenzene, 4-methyl-sulphonyl-2-amino-1-hydroxybenzene, 5- or 6-nitro-4-methyl sulphonyl-2-amino-1-hydroxybenzene, 2-amino-1-hydroxybenzene-4 or -5-sulphamide, 2-amino-1-hydroxybenzene-4- or -5-sulphomethylamide and 6-nitro-2-amino-1-hydroxybenzene-4-sulphamide.

If B is the radical of a diazo component, then in the production of metal-containing dyestuffs used according to the invention, as diazo component a 3-amino-2-hydroxybenzene-1-carboxylic acid for example can be used which can be substituted in the 5-position, for example, by halogen, alkyl, acylamino groups or by sulphonic acid amide groups which can be organically substituted at the nitrogen atom, also by alkyl or aryl sulphonyl groups. In this case, all unsulphonated compounds coupling in the neighbouring position to a metallisable group can be used as coupling components, e.g. 5-pyrazolones, acylacetyl anilides or hydroxynapththalenes or aminonanphthalenes coupling in a neighbouring position to the hydroxyl or amino group. The dyestuffs are metallised by the usual methods by treatment with agents giving off metal, the metallising process being performed in water or aqueous organic solution or suspension in the heat. 2:1 complexes are preferred. Advantageously the simple or complex salts of chromium or cobalt are used as agents giving off metal.

The new acetone-soluble complex salts are precipitated from the aqueous solutions of the metallised azo dyestuffs with organic amines. Organic amines without dyestuff character used for the precipitation are, chiefly, hydroaromatic amines, in particular aminoalkyl-polyalkyl-polyhydrophenanthrenes such as Rosinamine D (dihydroabietylamine) and dicyclohexamine. However, also alkylamines such as isoamylamine, octylamine, dodecylamine or amine ODT (lauryl-aminoethyl-ethylene diamine) can well be used. In addition, dibutyl aniline, dodecylaniline, xylidine, aminotetrahydronaphthalene, toluidine, aniline or diphenyl guanidine can be used.

It has also been found that these organic amines without dyestuff character can be replaced by up to 30 mol percent of basic dyestuffs whereupon the good solubility in acetone of the end products is retained. The use of basic dyestuffs enables shades of greater strength and brilliance to be attained. Carbonium dyestuffs are used in particular as basic dyestuffs. Of these can be named, in particular, diphenyl methane dyestuffs of the auramine series such as Auramine O (G. Schultz, Dyestuff Tables, 7th edition, No. 752) and Auramine G (No. 753); triphenyl methane dyestuffs of the malachite green series such as malachite Green (No. 754), Brilliant Green (No. 760), Setocyanine O (No. 762) and Setoglaucine O No. 755) and basic dyestuffs of the magenta series such as Victoria Blue B (No. 822); and, chiefly, xanthene dyestuffs of the rhodamine series such as Rhodamine B (No. 864), Rhodamine G (No. 865) and Rhodamine 6G (No. 866). Also dyestuffs containing cyclammonium groups, for example red basic dyestuffs such as are obtained by alkylating p-aminoazo dyestuffs containing a triazole ring, or, also blue basic dyestuffs such as are obtained by alkylating p-aminoazo dyestuffs containing a benzthiazole ring can be mentioned.

More specifically, the application concerns reaction products of one mol of a metalliferous monoazo dyestuff containing a metal selected from the group consisting of chromium and cobalt bound in complex union with a monoazo dyestuff free from sulphonic acid groups of the general formula

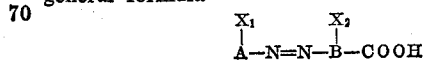

wherein:

A represents a member selected from the group consisting of aromatic radicals of the benzene, naphthalene, pyrazolone and acylacetyl arylamide series;

B represents a member selected from the group consisting of the benzene and naphthalene series, wherein the carboxyl group is bound in neighbouring position to $X_2$;

of $X_1$ and $X_2$, one represents the hydroxy group bound in o-position to the azo group and the other represents a member selected from the group consisting of hydroxy and amino groups bound in o-position to the azo group;

with organic nitrogen bases consisting of 70–100 mol percent of a colourless organic amine and 30–0 mol percent of a basic dyestuff.

Hydroaromatic amines and aliphatic amines and, in particular, dehydroabietylamine are preferred colourless organic amines. Carbonium dyestuffs and, of these, again, the xanthene dyestuffs are preferred basic dyestuffs.

In addition, cobalt complexes of monoazo dyestuffs which, as already mentioned, contain a functionally converted sulphonic acid group such as sulphonic acid amide and alkyl sulphonyl groups, produce particularly valuable conversion products.

Because of their good solubility in acetone, the new conversion products of azo dyestuffs containing heavy metal bound in complex linkage are very suitable for the dyeing of cellulose acetate in the mass as well as for the dyeing of lacquers. Acetate silk dyed in the mass is distinguished by good wet fastness properties such as e.g. fastness to washing, water, sea water, perspiration, by good fastness to rubbing, dry cleaning and ironing and very good fastness to light.

The following examples illustrate the invention. Parts are given as parts by weight and the temperatures are in degrees Centigrade. The relationship of parts by weight to parts by volume is as that of kilogrammes to litres.

EXAMPLE 1

38.6 parts of monoazo dyestuff from diazotised 2-aminophenol-4-methyl sulphone and 2.3-hydroxynaphthoic acid and 6 parts of tartaric acid are dissolved in 300 parts of water at 80° with the addition of sodium carbonate so that the reaction is neutral. After adding 100 parts of an aqueous solution of cobalt acetate, containing 3.5% of cobalt, the mixture is refluxed for 6 hours. The solution of the cobalt-containing dyestuff is clarified by filtration and a weakly formic acid aqueous solution of 15 parts of Rosinamine D (dehydroabietylamine) is added to the filtrate at 70°. The dyestuff which precipitates is filtered off, thoroughly washed with hot water and dried.

The dry dyestuff is a dark red powder which dissolves well in many organic solvents, in particular in acetone. It can thus be used for the dyeing of various lacquers, e.g. of nitro lacquers or annealing lacquers as well as for the dyeing of acetate silk in the cass. The Bordeaux red dyeings of acetate silk dyed in the spinning mass are distinguished by good wet fastness properties and excellent fastness to light.

Very similar products are obtained if in the above example the diazotised 2-aminophenol-4-methyl sulphone is replaced by the corresponding amount of diazotised 2-aminophenol-5-ethyl sulphone, 2-aminophenyl-4-sulphamide or -4-sulphomethylamide, or 3-amino-4-hydroxydiphenyl sulphone-3'-sulphamide. Similar dyestuffs are also obtained if equivalent amounts of octylamine, dodecylamine, dicyclohexylamine or amine ODT (lauryl-aminoethyl ethylene diamine) are used as basic precipitating agent.

EXAMPLE 2

The cobalt-containing monoazo dyestuff from diazotised 2-aminophenol-4-methyl sulphone and 2.3-hydroxynaphthoic acid is first partially precipitated from the aqueous solution described in Example 1 by the addition at 70° of an aqueous solution of 5 parts of Rhodamine B (tetra-ethyldiamino-o-carboxyphenyl-xanthylium chloride) in 100 parts of water and completely precipitated by the addition of a formic acid solution of 11.5 parts of Rosinamine D in 100 parts of water. The precipitated dyestuff is filtered off, washed with a great deal of water and dried whereupon a vivid red powder is obtained. In organic solvents such as e.g. acetone, it is soluble and can be used for the dyeing of lacquers, e.g. nitro lacquer. The good and complete solubility of the product in acetone enables it to be used for the dyeing of acetate silk in the mass. Acetate silk dyed in the spinning mass therewith has a vivid bluish red shade and is distinguished by good wet fastness properties and excellent fastness to light.

Very similar products are obtained if in the above example, the Rhodamine B is replaced by equivalent amounts of Rhodamine G (triethyldiamino-o-carboxyphenyl xanthylium chloride ethyl ester), Rhodamine 6G (symmetrical diethyldiamino-o-carboxyphenyl xanthylium chloride ethyl ester), Auramine G (symmetrical dimethyl-di-p-amino-di-o.o'-methylbenzophenonimine hydrochloride) or of the red basic dyestuff such as is obtained by alkylation of a p-aminoazo dyestuff containing a triazole ring. Rosinamine D can also be replaced by equimolecular amounts of dicyclohexylamine or diphenyl guanidine.

EXAMPLE 3

43.1 parts of the monoazo dyestuff from diazotised 5-nitro-2-aminophenol-4-methyl sulphone and 2.3-hydroxynaphthoic acid are dissolved in 500 parts of water with the addition of 10 parts of sodium carbonate. The solution obtained and 100 parts of a solution of the ammonium salt of disalicylato chromic acid, containing 2.7% chromium, are refluxed for 6 hours. The solution of the chromium-containing dyestuff is mixed at 70° with a solution of 4.5 parts of Setoglaucine O (symmetrical tetramethyl-p-amino-o-chloro-fuchsone imonium chloride) in 100 parts of water and a solution of 11.5 parts of Rosinamine D and 5 parts of formic acid 85% in 200 parts of water. The dyestuff which precipitates is filtered off, washed with a great deal of water and dried.

The dry product is a black powder. It is insoluble in water but dissolves easily in many organic solvents. It can be used for the dyeing of lacquers, e.g. of nitro and annealing lacquers. Because it has perfect solubility in acetone, this dye salt is suitable for the dyeing of acetate silk in the mass. Acetate silk dyed in the spinning mass has a blue colour and good fastness to wet and light.

Dyestuffs having very similar properties are obtained if in the above example, a corresponding amount of a dyestuff produced from diazotised 5-nitro-2-aminophenol, 6-nitro-2-aminophenol-4-ethyl sulphone, 6-nitro-2-aminophenol-4-sulphamide or from a mixture of these compounds is used for the chroming. The same results are obtained if Setoglaucin O is replaced by equivalent amounts of Setocyanine O (symmetrical diethyl-p-amino-m.m'-dimethyl-o-chloro-fuchsone imonium chloride), Victoria Blue B (tetramethylphenyl-p.p'-diaminodiphenonaphtho-fuchsone imonium chloride) or of a blue basic dyestuff obtained by alkylation of a p-aminoazo dyestuff containing a benzthiazole ring. Also the Rosinamine D can be replaced by dodecylamine or dicyclohexylamine.

EXAMPLE 4

43 parts of the monoazo dyestuff from diazotised 6-nitro-2-aminophenol-4-methyl sulphone and 2.3-aminonaphthoic acid and 7 parts of tartaric acid are pasted at 80° in 700 parts of water and dissolved with 25 parts of sodium carbonate. 100 parts of an aqueous solution of cobalt acetate, containing 3.3% cobalt, are added to this solution and the mixture is refluxed for 4 hours. A slight amount of a black slurry is removed from the solution of the cobalt-containing dyestuff by filtration and the filtrate is cooled to 60°. At this temperature a formic acid solution of 16 parts of Rosinamine D in 200 parts of water is stirred in whereupon the dyestuff precipitates. It is filtered off, washed with water and dried.

The dry dye salt is a dark green powder. It is insoluble in hot water but easily soluble in organic solvents, e.g. in ethyl alcohol or acetone. It can be used for dyeing lacquers, e.g. nitro and annealing lacquers and for the dyeing of acetyl cellulose in the mass. Acetyl cellulose dyed in the spinning mass has a vivid green shade and good wet fastness and excellent fastness to light.

Dyestuffs having very similar properties are obtained if monoazo dyestuffs are used, the diazo component of which is produced from 6-nitro-2-aminophenol-4-sulphamide, 5-nitro-2-aminophenol-4-ethyl sulphone. Also dyestuffs which dissolve well in acetone are obtained if in the above example, the Rosinamine D is completely or partly replaced by isoamylamine, tert. octylamine dodecylamine or dicyclohexylamine.

Products having greater colour strength and more brilliant shade are obtained if, in the above example, 20–30 mol percent of the colourless basic precipitating agent is replaced by basic dyestuffs such as Setocyanine O (symmetrical diethyl-p-amino-m.m'-dimethyl-o-chloro-fuchsone imonium chloride), Setoglaucine O (symmetrical tetramethyl-p-amino-o-chloro-fuchsone imonium chloride), Malachite Green (symmetrical tetramethyl-p-amino-fuchsone imonium chloride), Brilliant Green (symmetrical tetra-ethyl-p-amino-fuchsone imonium sulphate) or Victoria Blue (tetramethyl-phenyl-p.p'-diaminodiphenonaphtho-fuchsone imonium chloride). Instead of these basic dyestuffs, also the blue dyestuffs can be used which are obtained by alkylation of p-aminoazo dyestuffs containing a benzthiazole ring, if the precipitation is performed according to the process described in Example 2. The dyestuffs so obtained dissolve very well in acetone and can be used for the dyeing of lacquers and of acetylcellulose in the mass.

EXAMPLE 5

43.1 parts of the monoazo dyestuff from diazotised 2-amino-4-methyl phenol-6-carboxylic acid and 1-phenyl-3-methyl-5-pyrazolone-3'-sulphamide are dissolved in 400 parts of water with the addition of 15 parts of 25% ammonia. 100 parts of an aqueous solution of the ammonium salt of disalicylato chromic acid is added, containing 3.2% chromium, and the whole is refluxed for 6 hours.

The solution of the chromium-containing dyestuff is cooled to 70° and mixed with a solution of 17.1 parts of Rosinamine D and 7 parts of 85% formic acid in 200 parts of water, whereupon the dyestuff precipitates. After stirring for 1 hour at 70°, the dyestuff is filtered off, the residue is washed with water and dried.

The dry product is a red powder. It is insoluble in hot water but dissolves well in many organic solvents such as e.g. acetone. It is suitable for the dyeing of lacquers, for example of nitro lacquer and for the dyeing of acetate silk in the mass.

The acetate silk dyed red in the spinning mass has very good fastness to wet and light.

Also products which are soluble in acetone are obtained if the metal-containing dyestuffs given in columns I and II of the following table are reacted in the manner described above with the bases mentioned in column III.

*Table*

| No. | I Monoazo | II metal | III base | IV shade in acetyl-cellulose |
|---|---|---|---|---|
| 1 | HOOC—⟨OH⟩—N=N—C(CH₃)=C—N(—C₆H₄—SO₂NH₂)—N, HO—C—CH₃ (structure with pyrazolone) | Co | dicyclohexylamine | yellow. |
| 2 | do | Cr | NH—CH₂—CH₂—NH₂ / CH₂ / CH₂ / NH—(CH₂)ₘ—CH₃ (amine ODT) | orange. |
| 3 | HOOC—⟨OH⟩—N=N—⟨OH naphthyl—SO₂NH₂⟩ | Co | Rosinamine D | bordeaux. |
| 4 | do | Cr | dicyclohexylamine | violet. |
| 5 | HOOC—⟨OH⟩—N=N—CH(COCH₃)(CO—NH—C₆H₄—SO₂CH₃) | Co | Rosinamine D | yellow. |

Table—Continued

| No. | I Monoazo | II metal | III base | IV shade in acetyl-cellulose |
|---|---|---|---|---|
| 6 | HOOC—[phenol with OH, CH₃]—N=N—C(CH₃)=... pyrazolone with HO—C, N-phenyl | Cr | ...do... | orange. |
| 7 | ...do... | Co | Dodecylamine | yellow. |
| 8 | HOOC—[phenol-OH]—N=N—[naphthol-OH] | Co | dicyclohexylamine | violet. |
| 9 | HOOC—[phenol OH, NO₂]—N=N—C(—C—CH₃)=...pyrazolone HO—C, N-(phenyl-SO₂NH₂, CH₃) | Cr | ...do... | orange. |
| 10 | HOOC—[phenol-OH]—N=N—CH(COCH₃)(CO—NH—phenyl-SO₂NHCH₃) | Co | ...do... | yellow. |
| 11 | HOOC—[phenol-OH, CH₃]—N=N—CH(COCH₃)(CO—NH—phenyl-SO₂CH₃) | Co | Rosinamine D | Do. |

EXAMPLE 6

If the chromium-containing monoazo dyestuff obtained according to Example 5 paragraph 1 from diazotised 2-amino-4-methyl-phenol-6-carboxylic acid and 1-phenyl-3-methyl-5-pyrazolone-3'-sulphamide is precipitated from aqueous solution at 70° first with a solution of 5 parts of Rhodamine G (triethyl diamino-o-carboxyphenyl xanthylium chloride) in 100 parts of water and then with a solution of 11.5 parts of Rosinamine D and 5 parts of 85% formic acid in 150 parts of water, filtered off, washed with water and then dried, a product is obtained which has considerably more colour strength and brilliance than the dyestuff described in Example 5. Because of its good solubility in many organic solvents, this product can be used for the dyeing of lacquers and of acetyl cellulose in the spinning mass. Acetate silk is dyed in the spinning mass a vivid red colour and the dyeings have very good fastness to wet and light.

Products having similar solubility and more brilliant shades are obtained if 20 to 30 mol percent of the nitrogen base given in column III of the table in Example 5 are replaced by a basic dyestuff of suitable shade, for example by Auramine O (tetramethyldiamino-benzophenone imine hydrochloride), Rhodamine G (triethyl-diamino-o-carboxyphenyl xanthylium chloride), Rhodamine 6G (symmetrical diethyldiamino-o-carboxyphenyl xanthylium chloride ethyl ester), Rhodamine B (tetraethyldiamino-o-carboxyphenyl xanthylium chloride), red alkylation products of triazolyl-p-aminophenylazo dyestuffs and blue alkylation products of benzthiazolyl-p-aminophenylazo dyestuffs.

EXAMPLE 7

2.6 parts of acetone soluble dyestuff according to Example 4 are sprinkled into 1000 parts of a solution of acetyl cellulose in acetone which has a solid content of 26%. 20 parts by volume of acetone are added and the mixture is rolled in a well closed flask until the dyestuff has completely dissolved. The dyed spinning solution is then forced through dies. The thread formed is passed through a long heated tube and then wound onto spools. The vivid green coloured cellulose acetate threads so obtained have excellent fastness to wet and light.

What I claim is:
1. The reaction product of one mol of a metallised monoazo dyestuff containing a metal selected from the group consisting of chromium and cobalt bound in complex union, which monoazo dyestuff is free from sulphonic acid groups and is selected from the group consisting of compounds of the formulae

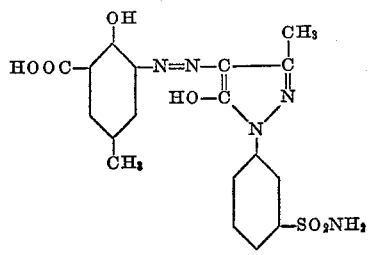

and

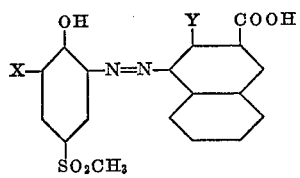

wherein X is a member selected from the group consisting of H and $NO_2$ and Y is a member selected from the group consisting of OH and $NH_2$, with an organic nitrogen base consisting of 70–100 mol percent of colourless organic amine selected from the group consisting of hydroaromatic amines and aliphatic amines and 30–0 mol percent of carbonium dyestuff.

2. The reaction product as claimed in claim 1, wherein the metal is cobalt, the amine is dehydroabietylamine and the dyestuff is xanthene dyestuff.

3. The reaction product of one mol of a cobaltiferous dyestuff containing cobalt bound in complex union, said monoazo dyestuff being of the formula

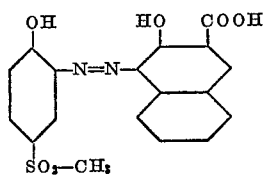

with 80 mol percent of dehydroabietylamine and 20 mol percent of Rhodamine B.

4. The reaction product of one mol of a cobaltierous monoazo dyestuff containing cobalt bound in complex union, said monoazo dyestuff being of the formula

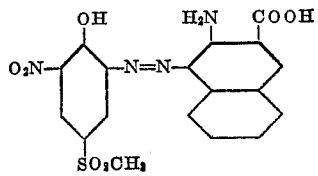

with 80 mol percent of dehydroabietylamine and 20 mol percent of Brilliant Green.

5. The compound of the formula

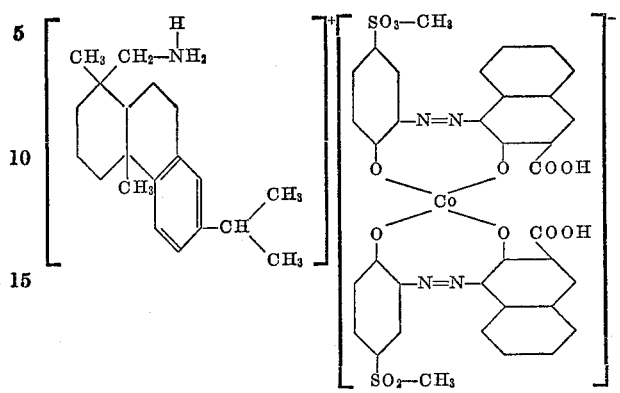

6. The compound of the formula

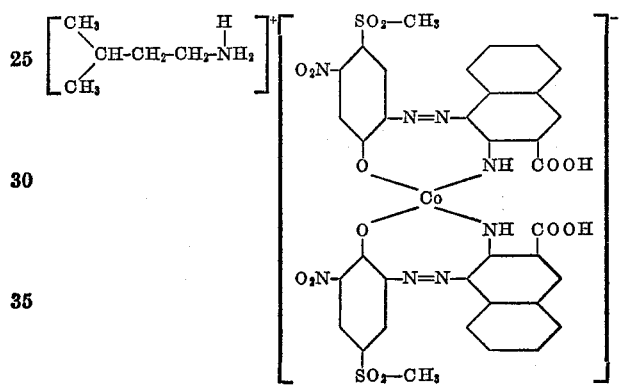

7. The compound of the formula

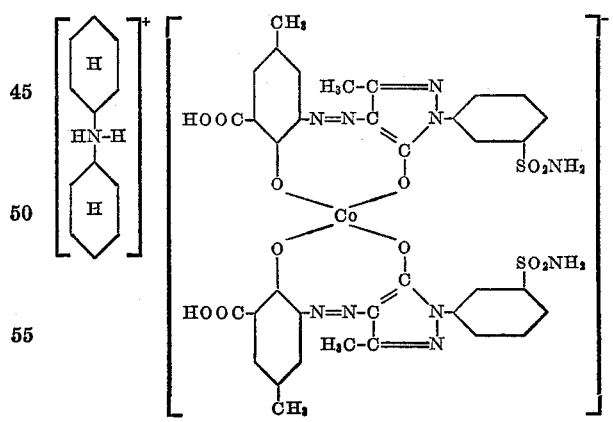

References Cited in the file of this patent

UNITED STATES PATENTS

| | | |
|---|---|---|
| 1,994,709 | Holzach et al. | Mar. 19, 1935 |
| 2,104,357 | Straub et al. | Jan. 4, 1938 |
| 2,315,870 | Nadler et al. | Apr. 6, 1943 |
| 2,814,614 | Zickendraht | Nov. 26, 1957 |
| 2,826,573 | Strobel et al. | Mar. 11, 1958 |

OTHER REFERENCES

Ser. No. 394,839, Mueller (A.P.C.), published Apr. 20, 1943, abandoned.

Hercules Powder Company Bulletin: "Rosin Amine D and its Derivatives," copyright 1956. (Available in Div. 38.)